UNITED STATES PATENT OFFICE.

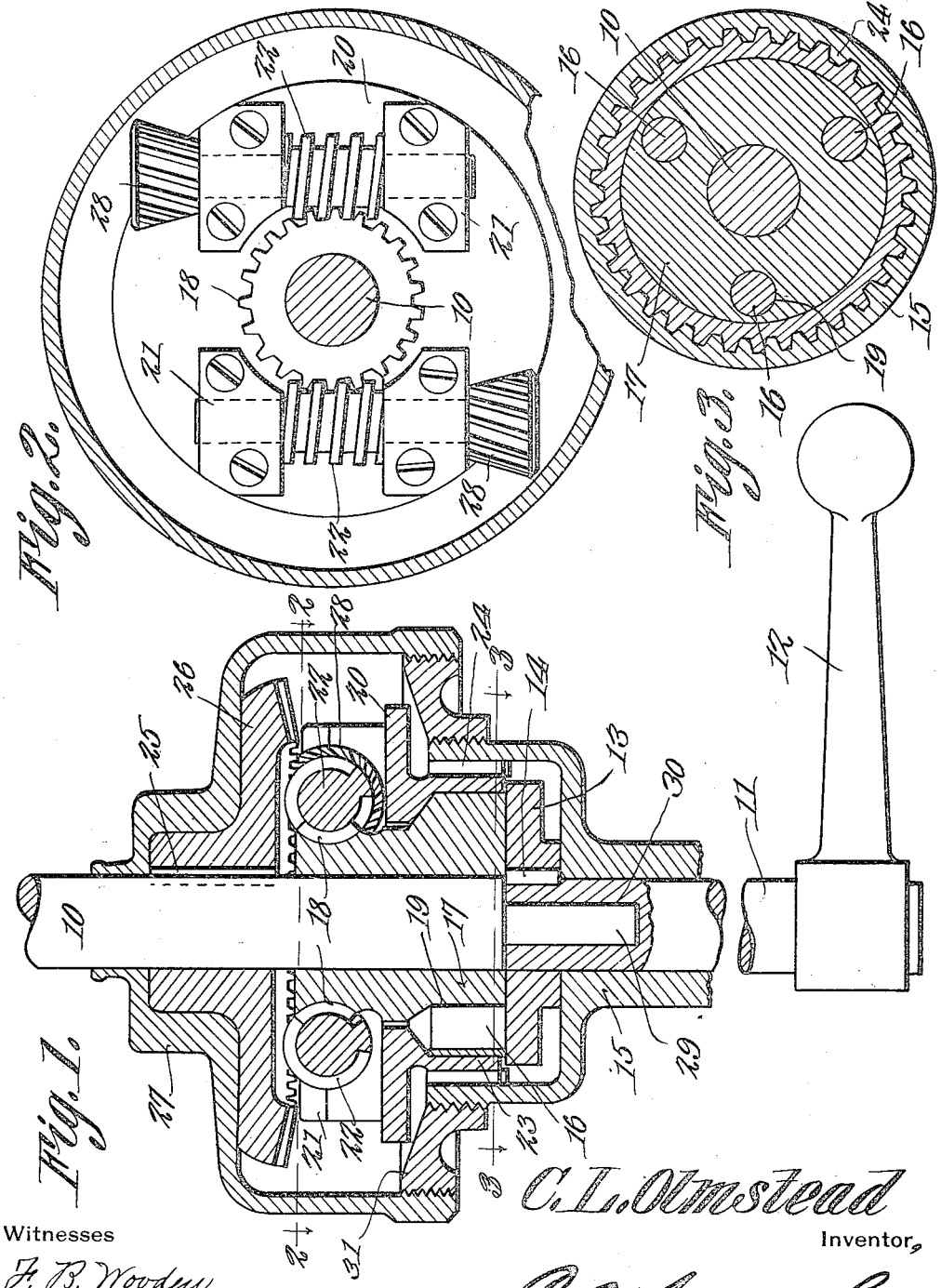

CHARLES L. OLMSTEAD, OF GREAT FALLS, MONTANA.

NON-REVERSING STEERING-GEAR.

1,232,379.  Specification of Letters Patent.  Patented July 3, 1917.

Application filed August 17, 1916. Serial No. 115,442.

*To all whom it may concern:*

Be it known that I, CHARLES L. OLMSTEAD, a citizen of the United States, residing at Great Falls, in the county of Cascade and State of Montana, have invented a new and useful Non-Reversing Steering-Gear, of which the following is a specification.

The object of the invention is to provide a transmission gear between the elements of a steering shaft whereby the reversal of the steering wheel due to unequal resistances encountered by the front wheels for example of an automobile, is prevented and the strain encountered by the operator is thereby relieved.

Further objects of the invention will appear as the description proceeds, it being understood that changes in the precise embodiment of the invention herein disclosed, can be made within the scope of what is claimed, without departing from the spirit of the invention.

In the accompanying drawings:—

Figure 1 is a sectional view of a gear constructed in accordance with the invention, showing portions of the steering shaft or spindle in operative relation therewith.

Fig. 2 is a transverse sectional view on the plane indicated by the line 2—2 of Fig. 1.

Fig. 3 is a transverse section on the plane indicated by the line 3—3 of Fig. 1.

The members of the steering shaft or spindle are represented respectively at 10 and 11, the former as usual being designed to carry the steering or hand wheel (not shown), while the latter carries the arm 12 ordinarily employed to communicate motion from the operated member 11 of said steering shaft or spindle to the steering bar (not shown) or other means by which the forward wheels of a machine are turned in the guidance of the vehicle.

In a well known form of transmission for this purpose, namely the one which is now commonly used on the Ford machine, there is employed a turning head or disk 13, keyed as at 14 to the operated member 11 of the steering shaft or spindle, and housing within the casing 15, and retaining these parts of said well known gear it is possible to apply the other features hereinafter described. The other features of the present gear may be substituted for the removed elements of the old gear without rearrangement of any of the other parts of the mechanism or machine. The head 13 is provided with upstanding studs 16 with which is engaged the base 17 of a worm gear 18, said base being provided with suitable sockets 19 for that purpose. On a stationary plate or support 20, and in bearings 21 thereof are mounted the spindles of worms 22 engaging said worm gear and serving to turn the same and therewith the operated member of the steering shaft or spindle. Said plate or support 20 is held in a fixed position by having a depending flange 23 which is exteriorly toothed to engage the internal gear 24 of the casing 15, this internal gear being found in the well known type of transmission to which reference has been made.

Keyed to the operating member of the steering shaft or spindle as at 25 is the master gear 26, housed within the casing member 27 and meshing with pinions 28 on the spindles of said worm 22, the engaging toothed faces of said master gear and pinions being preferably beveled as shown with the gear teeth set at a slight angle so as to mesh squarely notwithstanding the tangential arrangement of the axes of said worm spindles. Obviously the turning movement of the operating member of the steering shaft or spindle will be communicated through the master gear and pinion to the worm which in turn will communicate motion through the worm gear to the steering head and operated member of the said steering shaft or spindle, the operating member, as in the ordinary construction being provided with a pin 29 engaging a socket 30 in the said operated member. Also a supplemental casing element 31 may be employed to close the gap between the proximate edges of the casing members 15 and 27.

What is claimed is:—

1. The combination with operating and operated shaft members and a casing member having internal teeth, of a worm and a master gear respectively connected with the operated and operating shaft members, a stationary support having external teeth engaging said internal teeth, and worms mounted upon said support, in mesh with the worm gear and having pinions in mesh with said master gear.

2. The combination with operating and operated shaft members, a head secured to the operated shaft member and provided with upstanding studs, and a casing member having an internal gear, of a master gear secured to said operating shaft member, a worm gear having sockets engaged with said studs of the steering head, a stationary support having external gear teeth engaged with said internal gear, and worms mounted upon said support in mesh with the worm gear and provided with pinions meshing with the master gear.

3. An attachment for the purpose described comprising a master gear, a worm gear provided in its base with sockets, a supporting plate provided with an exteriorly toothed flange, a toothed casing coöperating therewith, worms mounted upon said support for engagement with the worm gear and having pinions meshing with said master gear, a turning head, and studs on the head and in the sockets.

In testimony that I claim the foregoing as my own, I have hereto affixed my signature in the presence of two witnesses.

CHARLES L. OLMSTEAD.

Witnesses:
  A. M. LARIMER,
  C. H. BOYD.

Copies of this patent may be obtained for five cents each, by addressing the "Commissioner of Patents, Washington, D. C."